US012350955B1

(12) United States Patent
Jin et al.

(10) Patent No.: US 12,350,955 B1
(45) Date of Patent: Jul. 8, 2025

(54) STAIR TREAD TEMPLATE RULER

(71) Applicant: Zhejiang Juxin Technology Co., Ltd., Jinhua (CN)

(72) Inventors: Xiongbin Jin, Jinhua (CN); Hui Zhan, Jinhua (CN)

(73) Assignee: Zhejiang Juxin Technology Co., Ltd., Jinhua (CN)

( * ) Notice: Subject to any disclaimer, the term of this patent is extended or adjusted under 35 U.S.C. 154(b) by 0 days.

(21) Appl. No.: 19/092,294

(22) Filed: Mar. 27, 2025

(30) Foreign Application Priority Data

Jan. 22, 2025 (CN) ......................... 202520151150.6
Mar. 11, 2025 (CN) ......................... 202520418098.6

(51) Int. Cl.
*B43L 7/12* (2006.01)

(52) U.S. Cl.
CPC .................................... *B43L 7/125* (2013.01)

(58) Field of Classification Search
CPC ....................................................... B43L 7/125
See application file for complete search history.

(56) References Cited

U.S. PATENT DOCUMENTS

| | | | | | |
|---|---|---|---|---|---|
| 759,319 | A * | 5/1904 | Schumacher | E04F 21/26 | 33/461 |
| 847,720 | A * | 3/1907 | Barbo | E04F 21/26 | 33/462 |
| 1,205,687 | A * | 11/1916 | Verhey | E04F 21/26 | 33/462 |
| 1,244,570 | A * | 10/1917 | Woods | E04F 21/26 | 33/462 |
| 1,261,596 | A * | 4/1918 | Murvine | E04F 21/26 | 33/462 |
| 1,489,789 | A * | 4/1924 | Ryan | E04F 21/26 | 33/461 |
| 1,624,535 | A * | 4/1927 | Christianson | E04F 21/26 | 33/461 |
| D287,944 | S * | 1/1987 | Hewston | D10/64 | |
| D305,873 | S * | 2/1990 | Bisson | D10/65 | |
| 7,467,471 | B1 * | 12/2008 | Sutter | B43L 9/04 | 33/194 |
| 7,841,095 | B1 * | 11/2010 | Board | B43L 7/02 | 33/470 |
| 8,375,592 | B1 * | 2/2013 | Holt | B43L 7/14 | 33/456 |
| 9,021,713 | B1 * | 5/2015 | Pierson | B43L 7/10 | 33/529 |
| D1,072,642 | S * | 4/2025 | Zhan | D10/64 | |
| 2017/0297193 | A1 * | 10/2017 | Young | B25H 7/00 | |

* cited by examiner

*Primary Examiner* — Yaritza Guadalupe-McCall
(74) *Attorney, Agent, or Firm* — JEEN IP LAW, LLC

(57) ABSTRACT

Disclosed is a stair tread template ruler, including a main ruler body, and two side ruler bodies. Either of the side ruler bodies is provided with a sliding member that can slide in a reciprocating manner, and the main ruler body is hingedly connected to the sliding members. The two side ruler bodies are arranged at both ends of the main ruler body, and the main ruler body and the two side ruler bodies cooperate to contour a space such as a staircase. The two side ruler bodies are connected to the main ruler body, the sliding members can slide to meet various use requirements, and the main ruler body is rotatably connected to the sliding members, which facilitates adjustment of a relative angle, meets user needs, and simplifies folding and storage. The main ruler body has a multi-segment structure, and each segment is slidably connected to another.

10 Claims, 11 Drawing Sheets

STAIR TREAD TEMPLATE RULER

CROSS-REFERENCE TO RELATED APPLICATIONS

This application claims priority to Chinese Patent Application No. 202520418098.6, filed on Mar. 11, 2025 and No. 202520151150.6, filed on Jan. 22, 2025 which is hereby incorporated by reference in its entirety.

TECHNICAL FIELD

The present disclosure relates to the technical field of surveying and mapping tools, and in particular to the technical field of stair tread template rulers.

BACKGROUND

In the construction process, particularly during flooring and tile laying, flooring materials and tiles need to be cut to fit edges of staircases or walls. Generally, measurement of rectangular staircases and walls, and marking and cutting of flooring materials and tiles are achieved just with straight rulers, but for non-rectangular, multi-angled, or complex structures, contouring cannot be completed just through the straight rulers of the prior art, resulting in inconvenience, low precision and inefficiency of contouring, thereby significantly affecting the construction progress.

SUMMARY

In order to solve the problems in the prior art, an objective of the present disclosure is to provide a stair tread template ruler that meets various sampling needs, and facilitates sampling and carrying.

To achieve the above objective, the present disclosure provides stair tread template ruler. The stair tread template ruler includes a main ruler body that is arranged horizontally, and two side ruler bodies that are arranged at both ends of the main ruler body, where either of the side ruler bodies is provided with a sliding member in a length direction thereof that can slide in a reciprocating manner, and the main ruler body is hingedly connected to the sliding members; the main ruler body is a telescopic ruler adjustable in an axial length, and the main ruler body comprises a left ruler body, a right ruler body, a first sliding ruler, and a second sliding ruler, wherein side edges of the first sliding ruler and the second sliding ruler are respectively provided with a connecting sliding groove and a connecting sliding rail in their respective length directions, and the connecting sliding rail and the connecting sliding groove are slidably connected with each other; the first sliding ruler and the second sliding ruler are respectively provided with a first inner sliding groove and a second inner sliding groove in their respective length directions, and the left ruler body and the right ruler body are respectively provided with a left bar ruler and a right bar ruler that are fitted with the first inner sliding groove and the second inner sliding groove, where the left bar ruler and the right bar ruler are slidably fitted with the first inner sliding groove and the second inner sliding groove, respectively; and one side of the main ruler body is provided with at least two positioning stop blocks that can protrude from an upper or lower side of the main ruler body.

Preferably, a first locking bolt is arranged between the first sliding ruler and the second sliding ruler, and the first locking bolt penetrates through either the first sliding ruler or the second sliding ruler and then abuts against and matches a side wall of the other sliding ruler.

Preferably, a second locking bolt is arranged between the left bar ruler and the first inner sliding groove, and also between the right bar ruler and the second inner sliding groove.

Preferably, the main ruler body is provided with an installation slot that is fitted with the positioning stop block, one end of the positioning stop block is hingedly connected to the installation slot through a shaft, and the positioning stop block can be stored inside the installation slot by rotating around the shaft, or extend outside the installation slot by rotating and be locked at an angle relatively perpendicular to the main ruler body.

Preferably, the main ruler body is provided with an inner recess that is communicated with the installation slot, and when the positioning stop block is stored inside the installation slot, the positioning stop block extends into the inner recess.

Preferably, the main ruler body is provided with an accommodating slot that is fitted with the positioning stop block, the positioning stop block is detachably connected to the accommodating slot, a hook groove is further formed on the upper or lower side of the main ruler body, a hook body that is detachably connected to the hook groove is arranged at one end of the positioning stop block, and when the hook body engages with the hook groove, one end of the positioning stop block extends outward from the upper or lower side of the main ruler body.

Preferably, a first magnetic steel is arranged inside the accommodating slot, and the positioning stop block has magnetic properties that enable magnetic fit with the first magnetic steel.

Preferably, either of the side ruler bodies is provided with a side ruler sliding groove formed in a length direction thereof, and the sliding member comprises a sliding block, a screw and a nut that are slidably arranged inside the side ruler sliding groove, where the screw is fixedly arranged on the sliding block, an end portion of the main ruler body is provided with a plurality of through holes fitted with the screw, and the screw penetrates through the through hole and is threadedly connected with the nut.

Preferably, a first limiting stop block and a second limiting stop block that are in limiting fit with each other are arranged on the first sliding ruler and the second sliding ruler, the first inner sliding groove and the left bar ruler, and the right bar ruler and the second inner sliding groove, respectively, where the first limiting stop block and the second limiting stop block cooperate with each other to limit an extreme extension position.

Preferably, the left ruler body is detachably connected to the left bar ruler, the right ruler body is detachably connected to the right bar ruler, the left ruler body is provided with a left plug-in slot that is fitted with an end portion of the left bar ruler, and the right ruler body is provided with a right plug-in slot that is fitted with the right bar ruler.

The stair tread template ruler of the present disclosure has the following beneficial effects: The two side ruler bodies are arranged at both ends of the main ruler body, and the main ruler body and the two side ruler bodies cooperate to contour a space such as a staircase. The two side ruler bodies are connected to the main ruler body through the sliding members, the sliding members can slide in a length direction of the side ruler bodies to meet various use requirements, and the main ruler body is rotatably connected to the sliding members, which facilitates adjustment of a relative angle between the main ruler body and the side ruler body, meets user needs, and simplifies folding and storage. The main ruler body has a multi-segment structure, and each segment is slidably connected to another, such that the main ruler body features multiple adjustment options, a larger extended length when unfolded, and a wider range of application, thereby meeting various application needs.

The features and advantages of the present disclosure will be described in detail with reference to the examples and the accompanying drawings.

Figure 1:
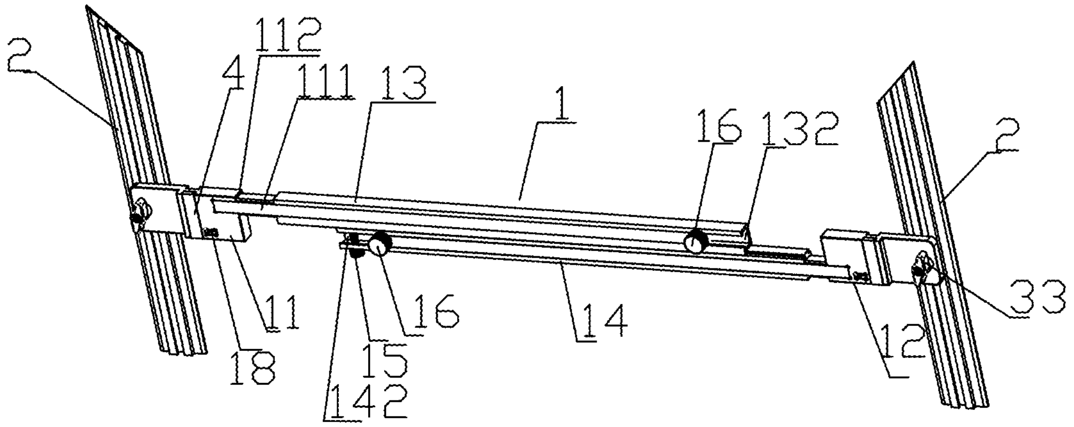
FIG. 1 is a schematic diagram of a three-dimensional structure of a stair tread template ruler in Example 1 of the present disclosure.

Reference numerals in the figures: 1—main ruler body; 2—side ruler body; 3—sliding member; 4—positioning stop block; 11—left ruler body; 12—right ruler body; 13—first sliding ruler; 14—second sliding ruler; 15—first locking bolt; 16—second locking bolt; 17—accommodating slot; 21—side ruler sliding groove; 31—sliding block; 32—screw; 33—nut; 41—gripping groove; 42—pin hole; 101—installation slot; 102—inner recess; 111—left bar ruler; 112—left plug-in slot; 121—right bar ruler; 122—right plug-in slot; 131—connecting sliding groove; 132—first inner sliding groove; 141—connecting sliding rail; 142—second inner sliding groove; 171—first magnetic steel; 211—stopper; 1311—first limiting stop block; and 1411—second limiting stop block.

DESCRIPTION OF EMBODIMENTS

For making the objectives, technical solutions and advantages of the present disclosure clearer, the present disclosure will be described in further detail below with reference to the accompanying drawings and the examples. It should be understood that the specific examples described herein are merely illustrative of the present disclosure and are not intended to limit the present disclosure. In addition, in the following descriptions, descriptions of well-known structures and technologies are omitted in order to avoid unnecessarily obscuring the concepts of the present disclosure.

In the descriptions of the present disclosure, it should be noted that when an element is referred to as being "fixed to" or "arranged on" another element, the element may be directly or indirectly on another element. When an element is referred to as being "connected to" another element, the element may be directly or indirectly connected to another element.

In the descriptions of the present disclosure, it should be noted that the terms "center", "length", "width", "thickness", "upper", "lower", "front", "back", "left", "right", "vertical", "horizontal", "top", "bottom", "inner", "outer", etc. indicate orientation or position relations based on those shown in the accompanying drawings, or of common placement when the product of the present disclosure is used, which are only for ease of description of the present disclosure and for simplicity of description, and are not intended to indicate or imply that the referenced device or element must have a particular orientation and be constructed and operated in a particular orientation, and thus may not be construed as a limitation on the present disclosure. Moreover, the terms "first", "second", "third", etc. are used merely to distinguish between descriptions and may not be construed as indication or implication of relative importance. Thus, a feature defined with "first" and "second" may explicitly or implicitly include one or more of the features. In the description of the present disclosure, "a plurality of" means two or more, unless expressly specified otherwise. "Several" means one or more, unless expressly specified otherwise.

In the description of the present disclosure, it should be further noted that, unless otherwise clearly specified, meanings of terms "arrange", "mount", "connected" and "connect" should be understood in a board sense. For example, the connection may be a fixed connection, a detachable connection, an integral connection; may be a mechanical connection or an electrical connection; may be a direct connection or an indirect connection by using an intermediate medium; or may be intercommunication between two components. For those of ordinary skill in the art, the specific meanings of the above terms in the present disclosure may be understood according to specific circumstances.

Example 1

With reference to FIGS. 1-4, a stair tread template ruler of the present disclosure includes a main ruler body 1 and two side ruler bodies 2 combined together, where the main ruler body 1 is arranged horizontally, the two side ruler bodies 2 are respectively arranged at both ends of the main ruler body 1, and both the main ruler body 1 and the side ruler bodies 2 are provided with scales. Either of the side ruler bodies 2 is provided with a sliding member 3 in a length direction thereof that can slide in a reciprocating manner, the main ruler body 1 is hingedly connected to the sliding members 3, and the main ruler body 1 includes a left ruler body 11, a right ruler body 12, a first sliding ruler 13, and a second sliding ruler 14, where side edges of the first sliding ruler 13 and the second sliding ruler 14 are respectively provided with a connecting sliding groove 131 and a connecting sliding rail 141 in their respective length directions, and the connecting sliding rail 141 and the connecting sliding groove 131 are slidably connected with each other; and the first sliding ruler 13 and the second sliding ruler 14 are respectively provided with a first inner sliding groove 132 and a second inner sliding groove 142 in their respective length directions, and the left ruler body 11 and the right ruler body 12 are respectively provided with a left bar ruler 111 and a right bar ruler 121 that are fitted with the first inner sliding groove 132 and the second inner sliding groove 142, where the left bar ruler 111 and the right bar ruler 121 are slidably fitted with the first inner sliding groove 132 and the second inner sliding groove 142, respectively. In this example, the main ruler body 1 is formed by combining the left ruler body 11, the right ruler body 12, the first sliding ruler 13, and the second sliding ruler 14, where the left ruler body 11 is slidably connected to the first inner sliding groove 132 of the first sliding ruler 13 through the left bar ruler 111, the right ruler body 12 is slidably connected to the second inner sliding groove 142 of the second sliding ruler 14 through the right bar ruler 121, and the first sliding ruler 13 and the second sliding ruler 14 are slidably connected through cooperation of the connecting sliding groove 131 and the connecting sliding rail 141. Such arrangement enables the main ruler body 1 to have a multi-segment structure, multiple adjustment options, a larger extended length when unfolded, and a wider range of application, thereby meeting various application needs. The two side ruler bodies 2 are arranged at both ends of the main ruler body 1, and the main ruler body 1 and the two side ruler bodies 2 cooperate to contour a space such as a staircase. In use, the ruler of the present disclosure is placed into a target space to be contoured, the side ruler bodies 2 are fitted with both sides of the target space, one side of the main ruler body 1 is fitted with a front side of the space such as the staircase, and the ruler of the present disclosure, after relative positions of the side ruler bodies 2 and the main ruler body 1 are secured, is removed and fitted onto a board or workpiece to scribe contour lines and cut the board or workpiece into a desired shape, such that more convenient, efficient, and precise contouring is achieved. The two side ruler bodies 2 are connected to the main ruler body 1 through the sliding members 3, the sliding members 3 can slide in a length direction of the side ruler bodies 2 to meet various use requirements, and the main ruler body 1 is rotatably connected to the sliding members 3, which facilitates adjustment of a relative angle between the main ruler body 1 and the side ruler body 2, meets user needs, and simplifies folding and storage.

With reference to FIGS. 1, 2, 3 and 5, the main ruler body 1 is further provided with two positioning stop blocks 4 that can protrude from a lower side of the main ruler body 1. The positioning stop blocks 4 can be fitted with a side of the staircase or the board/workpiece to be contoured to facilitate positioning and use and improve accuracy.

With reference to FIGS. 1, 2, 3 and 5, the main ruler body 1 is provided with an accommodating slot 17 that is fitted with the positioning stop block 4, the positioning stop block 4 is detachably connected to the accommodating slot 17, a hook groove 18 is further formed on an upper or lower side of the main ruler body 1, a hook body 41 that is detachably connected to the hook groove 18 is arranged at one end of the positioning stop block 4, and when the hook body 41 engages with the hook groove 18, one end of the positioning stop block 4 extends outward from the upper or lower side of the main ruler body 1. The positioning stop block 4 not in use can be fixed in the accommodating slot 17 through snap-fit connection, to facilitate carrying and prevent the positioning stop block 4 not in use from interfering with normal use of the ruler. When needed, the positioning stop block 4 can be removed from the accommodating slot, and the hook body 41 of the positioning stop block 4 can be inserted into the hook groove 18 for easy secure fixation.

Figure 3:
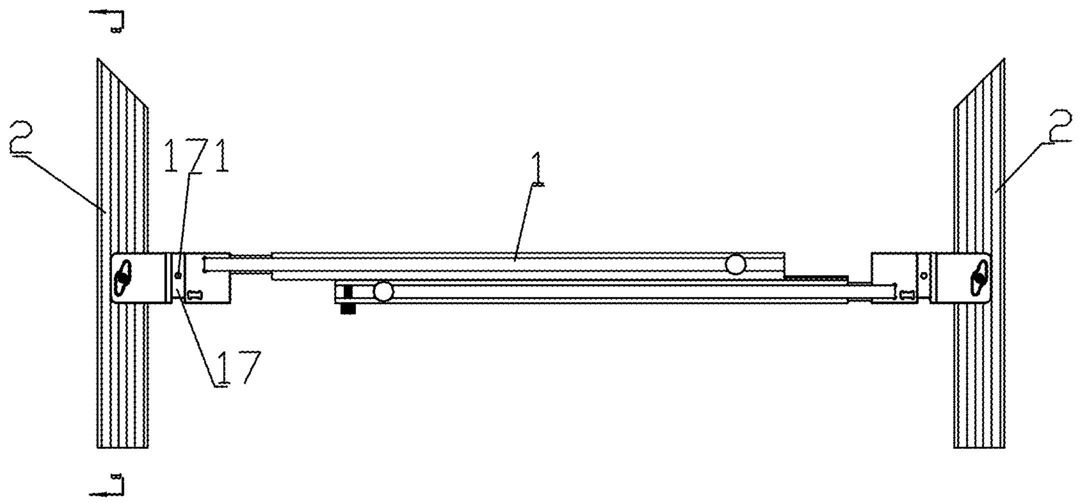
FIG. 3 is a schematic diagram of a top view of a stair tread template ruler of the present disclosure.

With reference to FIG. 3, a first magnetic steel 171 is arranged inside the accommodating slot 17, and the positioning stop block 4 has magnetic properties that enable magnetic fit with the first magnetic steel 171, which facilitates a more secure fixation of the positioning stop block 4.

Example 2

With reference to FIGS. 6, 7, 8, and 9, this example differs from Example 1 in that the main ruler body 1 is provided with an installation slot 101 that is fitted with the positioning stop block 4, one end of the positioning stop block 4 is hingedly connected to the installation slot 101 through a shaft, and the positioning stop block 4 can be stored inside the installation slot 101 by rotating around the shaft, or extend outside the installation slot 101 by rotating and be locked at an angle relatively perpendicular to the main ruler body 1. The installation slot 101 is formed on the main ruler body 1 to facilitate storage of the positioning stop block 4, the positioning stop block 4 can be directly flipped outward for convenient use when needed, and the positioning stop block 4 not in use does not protrude from the main ruler body 1, thereby ensuring normal use of the main ruler body 1.

Figure 6:
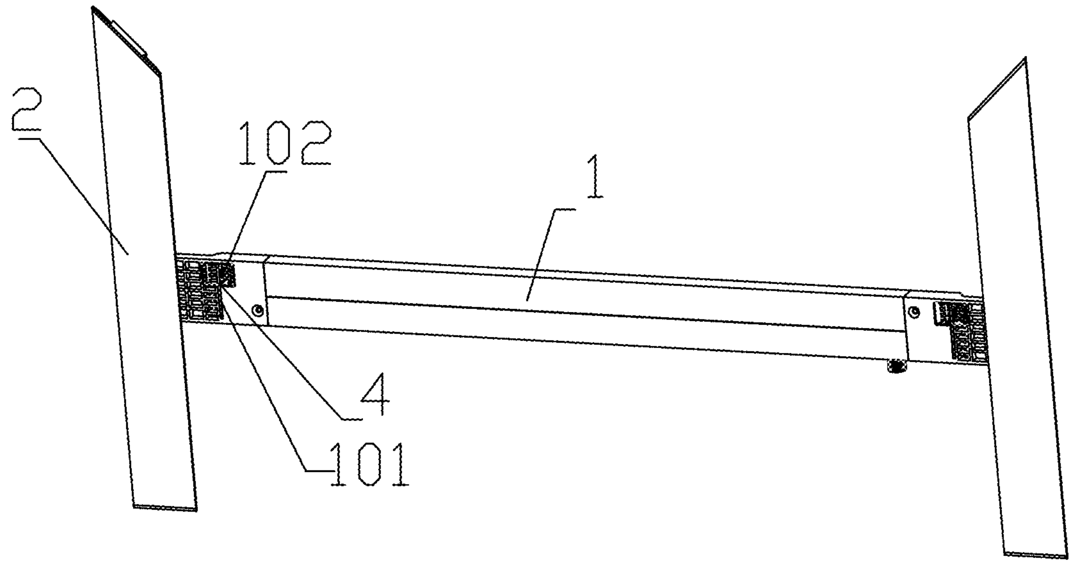
FIG. 6 is a schematic diagram of a three-dimensional structure of a stair tread template ruler in Example 2 of the present disclosure.
Figure 9:
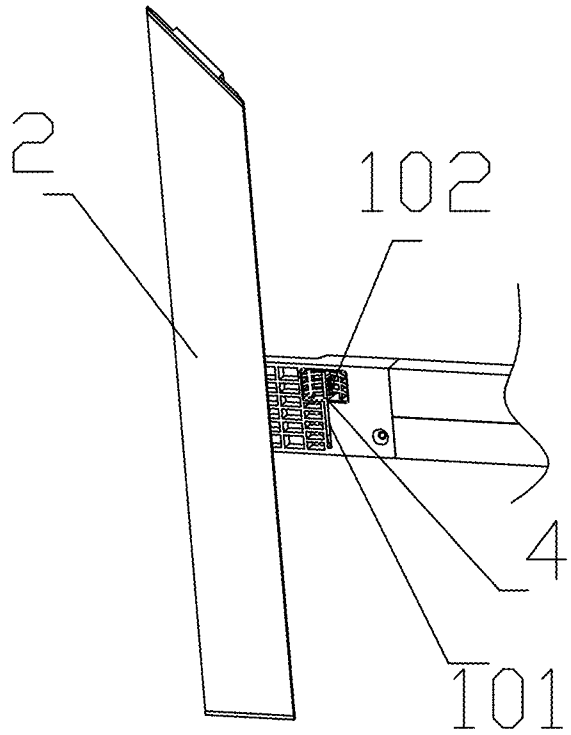
FIG. 9 is a schematic diagram of a partially enlarged structure of FIG. 6.

With reference to FIGS. 6 and 9, the main ruler body 1 is provided with an inner recess 102 that is communicated with the installation slot 101, and when the positioning stop block 4 is stored inside the installation slot 101, the positioning stop block 4 extends into the inner recess 102. Fingers of a user are allowed to enter the inner recess 102, which facilitates clamping of the positioning stop block 4 stored in the installation slot 101.

Figure 7:
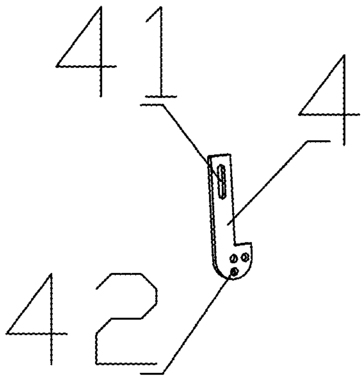
FIG. 7 is a schematic diagram of a three-dimensional structure of a positioning stop block in Example 2 of the present disclosure.
Figure 8:
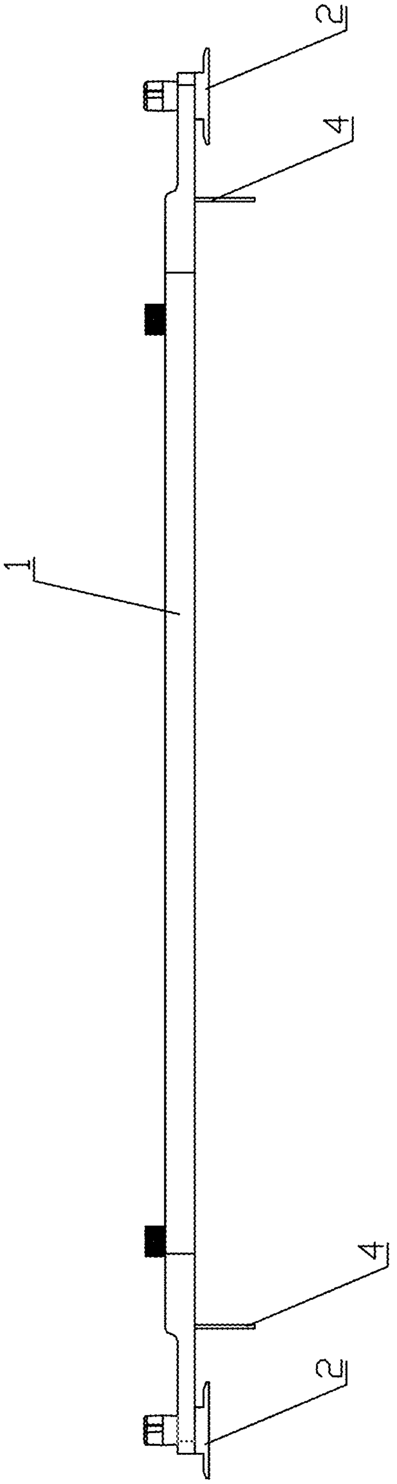
FIG. 8 is a structural schematic diagram of a front view of a positioning stop block extended in Example 2 of the present disclosure.

With reference to FIG. 7, the positioning stop block 4 is provided with a gripping groove 41 that is fitted with the inner recess 102. The gripping groove 41 cooperates with the user's fingers or nails, which increases friction, and facilitates removal of the positioning stop block 4.

Example 3

Figure 2:
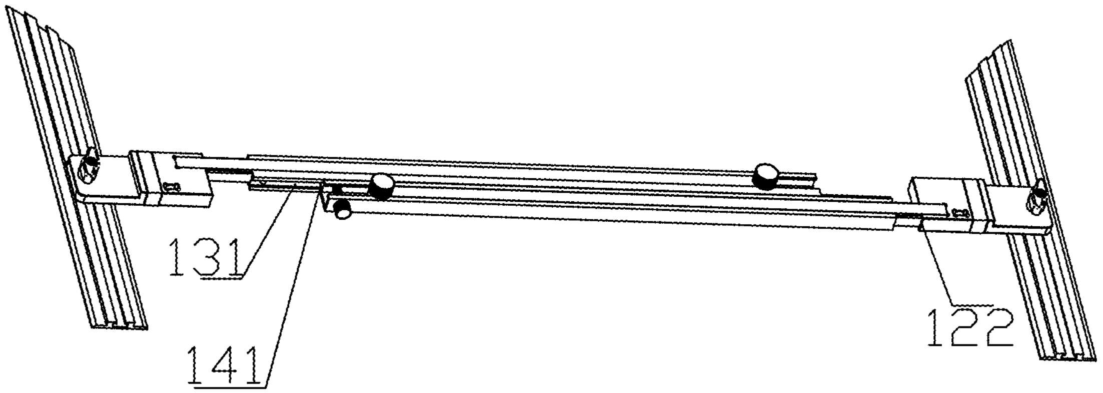
FIG. 2 is a schematic diagram of another view of a three-dimensional structure of a stair tread template ruler in Example 1 of the present disclosure.

With reference to FIGS. 1 and 2, based on Example 1 or 2, a first locking bolt 15 is arranged between the first sliding ruler 13 and the second sliding ruler 14, and the first locking bolt 15 penetrates through the second sliding ruler 14 and then abuts against and matches a side wall of the first sliding ruler 13. The first locking bolt 15 enables to lock relative positions of the first sliding ruler 13 and the second sliding ruler 14, which facilitates contouring and use.

With reference to FIGS. 1 and 2, a second locking bolt 16 is arranged between the left bar ruler 111 and the first inner sliding groove 132, and also between the right bar ruler 121 and the second inner sliding groove 142. The second locking bolt 16 enables to lock a relative position between the bar ruler and the inner sliding groove, which facilitates contouring and use.

With reference to FIGS. 1 and 2, the left ruler body 11 is detachably connected to the left bar ruler 111, the right ruler body 12 is detachably connected to the right bar ruler 121, the left ruler body 11 is provided with a left plug-in slot 112 that is fitted with an end portion of the left bar ruler 111, the right ruler body 12 is provided with a right plug-in slot 122 that is fitted with the right bar ruler 121, the left bar ruler 111 is fixed inside the left plug-in slot 112 through a screw, and the right bar ruler 121 is fixed inside the right plug-in slot 122 through a screw, thereby facilitating replacement, maintenance, and production.

Figure 4:
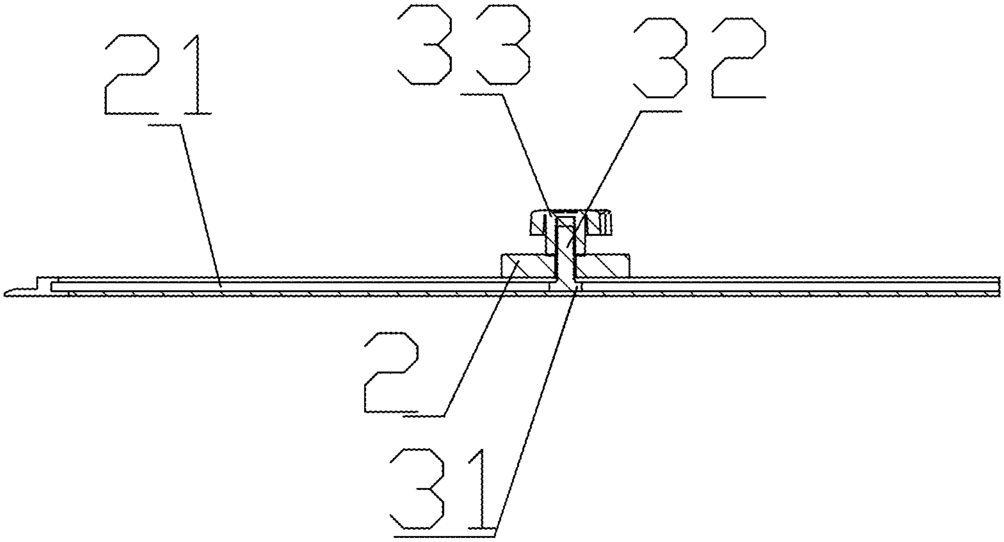
FIG. 4 is a schematic diagram of a sectional structure of the present disclosure in a B-B direction in FIG. 3.
Figure 5:
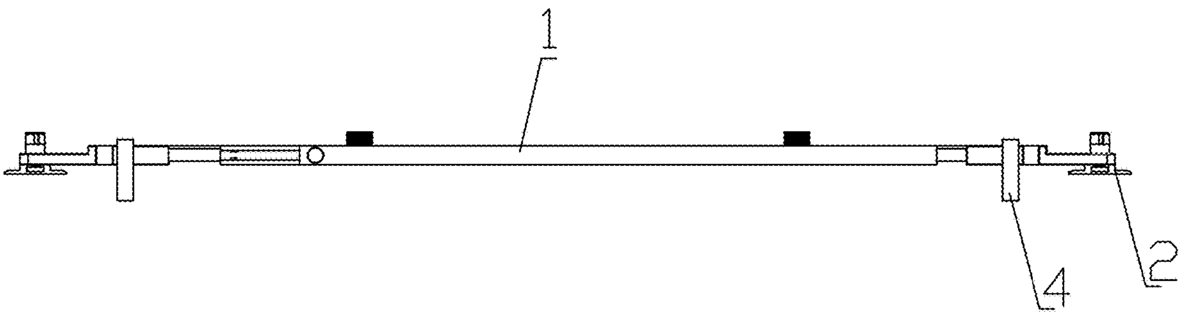
FIG. 5 is a structural schematic diagram of a front view of a stair tread template ruler with a positioning stop block arranged inside a hook groove of the present disclosure.

With reference to FIGS. 1 and 4, either of the side ruler bodies 2 is provided with a side ruler sliding groove 21 formed in a length direction thereof, and the sliding member 3 includes a sliding block 31, a screw 32 and a nut 33 that are slidably arranged inside the side ruler sliding groove 21, where the screw 32 is fixedly arranged on the sliding block 31, an end portion of the main ruler body 1 is provided with a through hole fitted with the screw 32, and the screw 32 penetrates through the through hole and is threadedly connected with the nut 33. After the nut 33 is tightened, a relative position and relative angle between the side ruler body 2 and the main ruler body 1 can be locked for convenient contouring, and normal use is ensured after loosening.

Figure 10:
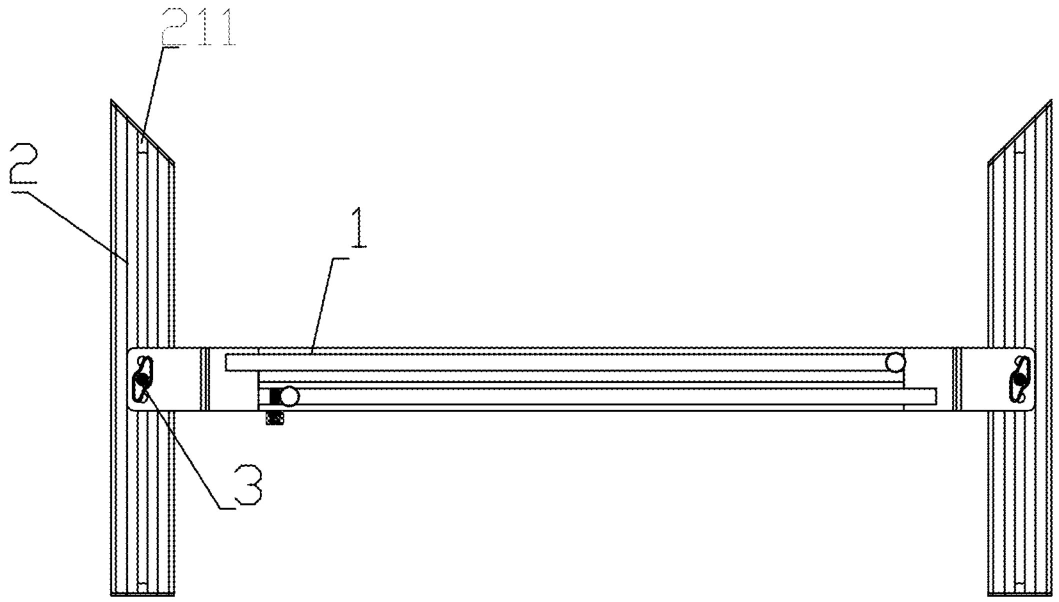
FIG. 10 is a schematic diagram of a top view of Example 3 of the present disclosure.

With reference to FIG. 10, an end portion of the side ruler sliding groove 21 is provided with a stopper 211 for sealing the side ruler sliding groove 21, and the stoppers 211 are arranged at both ends thereof to prevent the sliding block 31 from disengaging from the side ruler sliding groove 21.

With reference to FIG. 10, either of the side ruler bodies 2 is provided with three through holes located at different positions and configured to be fitted with the screw 32. The through holes are located at different positions, and different through holes can be selected to match with the sliding member 3, so as to adjust a connection position between the side ruler body 2 and the sliding member 3 and meet various use needs.

Example 4

Figure 11:
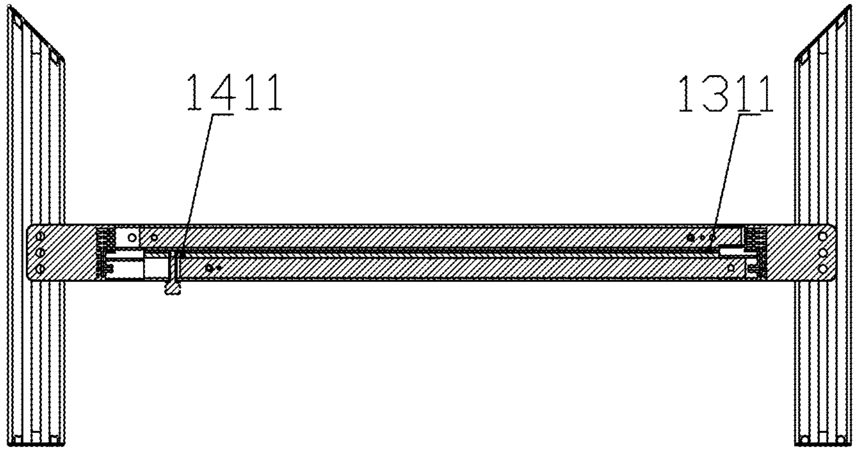
FIG. 11 is a schematic diagram of a sectional structure of Example 4 of the present disclosure.

With reference to FIG. 11, a first limiting stop block 1311 and a second limiting stop block 1411 that are in limiting fit with each other are arranged on the first sliding ruler 13 and the second sliding ruler 14, the first inner sliding groove 132 and the left bar ruler 111, and the right bar ruler 121 and the second inner sliding groove 142, respectively, where the first limiting stop block 1311 and the second limiting stop block 1411 cooperate with each other to limit an extreme extension position. The cooperation between the first limiting stop block 1311 and the second limiting stop block 1411 enables to limit an extreme relative position between the first sliding ruler 13 and the second sliding ruler 14, between the first inner sliding groove 132 and the left bar ruler 111, and between the right bar ruler 121 and the second inner sliding groove 142, respectively, which plays a limiting role and prevents separation caused by excessive extension, thereby ensuring more stability of use.

A working process of the present disclosure is as follows:

The stair tread template ruler of the present disclosure is used as follows: the ruler of the present disclosure is placed into a target space to be contoured, the side ruler bodies 2 are fitted with both sides of the target space, the positioning stop block 4 on the main ruler body 1 is extended outward, the positioning stop block 4 is fitted with a front side of the space such as the staircase, and the ruler of the present disclosure, after relative positions of the side ruler bodies 2 and the main ruler body 1 are secured, is removed and fitted onto a board or workpiece to scribe contour lines and cut the board or workpiece into a desired shape, such that more convenient, efficient, and precise contouring is achieved.

Standard parts referenced in the present disclosure can be purchased from the market, and are connected through specific mature conventional connection methods of the prior art for bolts, rivets, welding and the like. Inner components such as electric sliding rail carriages, cylinders, welding machines, electric telescopic rods and controllers are of conventional models in the prior art, and their internal structures belong to structures of the prior art. Workers can perform normal operations according to manuals of the prior art, and conventional circuit connection methods of the prior art are adopted, so details are not described herein.

It should be noted that the above examples have been described herein, but are not intended to limit the patent scope of the present disclosure. Therefore, changes and modifications of made to the example described herein based on the innovative concepts of the present disclosure, or any equivalent structure or equivalent process transformation made by using the description of the present disclosure and the contents of the accompanying drawings, with the above technical solution directly or indirectly used in other related technical fields, are all included in the protection scope of the present disclosure.

What is claimed is:

1. A stair tread template ruler, comprising a main ruler body that is arranged horizontally, and two side ruler bodies that are arranged at both ends of the main ruler body, wherein either of the side ruler bodies is provided with a sliding member in a length direction thereof that can slide in a reciprocating manner, and the main ruler body is hingedly connected to the sliding members; the main ruler body is a telescopic ruler adjustable in an axial length, and the main ruler body comprises a left ruler body, a right ruler body, a first sliding ruler, and a second sliding ruler, wherein side edges of the first sliding ruler and the second sliding ruler are respectively provided with a connecting sliding groove and a connecting sliding rail in their respective length directions, and the connecting sliding rail and the connecting sliding groove are slidably connected with each other; the first sliding ruler and the second sliding ruler are respectively provided with a first inner sliding groove and a second inner sliding groove in their respective length directions, and the left ruler body and the right ruler body are respectively provided with a left bar ruler and a right bar ruler that are fitted with the first inner sliding groove and the second inner sliding groove, wherein the left bar ruler and the right bar ruler are slidably fitted with the first inner sliding groove and the second inner sliding groove, respectively; and one side of the main ruler body is provided with at least two positioning stop blocks that can protrude from an upper or lower side of the main ruler body.

2. The stair tread template ruler according to claim 1, wherein a first locking bolt is arranged between the first sliding ruler and the second sliding ruler, and the first locking bolt penetrates through either the first sliding ruler or the second sliding ruler and then abuts against and matches a side wall of the other sliding ruler.

3. The stair tread template ruler according to claim 1, wherein a second locking bolt is arranged between the left bar ruler and the first inner sliding groove, and also between the right bar ruler and the second inner sliding groove.

4. The stair tread template ruler according to claim 1, wherein the main ruler body is provided with an installation slot that is fitted with the positioning stop block, one end of the positioning stop block is hingedly connected to the installation slot through a shaft, and the positioning stop block can be stored inside the installation slot by rotating around the shaft, or extend outside the installation slot by rotating and be locked at an angle relatively perpendicular to the main ruler body.

5. The stair tread template ruler according to claim 4, wherein the main ruler body is provided with an inner recess that is communicated with the installation slot, and when the positioning stop block is stored inside the installation slot, the positioning stop block extends into the inner recess.

6. The stair tread template ruler according to claim 1, the main ruler body is provided with an accommodating slot that is fitted with the positioning stop block, the positioning stop block is detachably connected to the accommodating slot, a hook groove is further formed on the upper or lower side of the main ruler body, a hook body that is detachably connected to the hook groove is arranged at one end of the positioning stop block, and when the hook body engages with the hook groove, one end of the positioning stop block extends outward from the upper or lower side of the main ruler body.

7. The stair tread template ruler according to claim 6, wherein a first magnetic steel is arranged inside the accommodating slot, and the positioning stop block has magnetic properties that enable magnetic fit with the first magnetic steel.

8. The stair tread template ruler according to claim 1, wherein either of the side ruler bodies is provided with a side ruler sliding groove formed in a length direction thereof, and the sliding member comprises a sliding block, a screw and a nut that are slidably arranged inside the side ruler sliding groove, wherein the screw is fixedly arranged on the sliding block, an end portion of the main ruler body is provided with a plurality of through holes fitted with the screw, and the screw penetrates through the through hole and is threadedly connected with the nut.

9. The stair tread template ruler according to claim 1, wherein a first limiting stop block and a second limiting stop block that are in limiting fit with each other are arranged on the first sliding ruler and the second sliding ruler, the first inner sliding groove and the left bar ruler, and the right bar ruler and the second inner sliding groove, respectively, wherein the first limiting stop block and the second limiting stop block cooperate with each other to limit an extreme extension position.

10. The stair tread template ruler according to claim 1, wherein the left ruler body is detachably connected to the left bar ruler, the right ruler body is detachably connected to the right bar ruler, the left ruler body is provided with a left plug-in slot that is fitted with an end portion of the left bar ruler, and the right ruler body is provided with a right plug-in slot that is fitted with the right bar ruler.

* * * * *